United States Patent
Christoffersen et al.

(10) Patent No.: US 11,879,439 B2
(45) Date of Patent: Jan. 23, 2024

(54) WIND TURBINE DRIVETRAIN COMPONENT WITH LOW FRICTION RADIAL SHAFT SEAL

(71) Applicant: Vestas Wind Systems A/S, Aarhus N. (DK)

(72) Inventors: Leif Christoffersen, Vejle Øst (DK); Lars Langvardt Krogh, Egå (DK); Lars Skifter, Randers Sø (DK); Thomas Paw Buus, Ans By (DK)

(73) Assignee: Vestas Wind Systems A/S, Aarhus (DK)

( * ) Notice: Subject to any disclaimer, the term of this patent is extended or adjusted under 35 U.S.C. 154(b) by 644 days.

(21) Appl. No.: 17/046,319

(22) PCT Filed: Dec. 10, 2018

(86) PCT No.: PCT/DK2018/050341
§ 371 (c)(1),
(2) Date: Oct. 9, 2020

(87) PCT Pub. No.: WO2019/196994
PCT Pub. Date: Oct. 17, 2019

(65) Prior Publication Data
US 2021/0102528 A1 Apr. 8, 2021

(30) Foreign Application Priority Data

Apr. 12, 2018 (DK) .......................... PA 2018 70219

(51) Int. Cl.
*F03D 80/70* (2016.01)
*F03D 15/00* (2016.01)
(Continued)

(52) U.S. Cl.
CPC ............. *F03D 80/70* (2016.05); *F03D 15/00* (2016.05); *F16H 57/04* (2013.01); *F16H 57/045* (2013.01);
(Continued)

(58) Field of Classification Search
CPC ....... F03D 80/70; F05B 2240/57; F16J 15/54; F16N 2210/025; Y02E 10/72
See application file for complete search history.

(56) References Cited

U.S. PATENT DOCUMENTS 773,297 A 10/1904 Nash
822,802 A * 6/1906 Wilkinson ............... F16J 15/42
277/427
(Continued)

FOREIGN PATENT DOCUMENTS

CN 101595277 A 12/2009
CN 102022538 A 4/2011
(Continued)

OTHER PUBLICATIONS

European Patent Office, Examination Report in EP18821998.4, dated Aug. 11, 2021.
(Continued)

*Primary Examiner* — Anthony Ayala Delgado
(74) *Attorney, Agent, or Firm* — Wood Herron & Evans LLP (57) ABSTRACT

A wind turbine drive train component (22) comprising a rotating shaft (61) with a radial seal (50) is provided. The radial seal (50) comprises a stationary part and a rotating part. The stationary part comprises a ring (51) with an inner edge and an outer edge, the inner edge being configured for contactlessly surrounding the shaft (61). The rotary part comprising a disc (52), coaxially connected to the shaft (61) for rotation therewith and comprising a flange (53) that
(Continued)

wraps around the outer edge of the ring (51). The radial seal (50) further comprises an annular air lock gap (55) for containing an amount of lubrication fluid (64) and thereby closing off the air lock gap (55) when the rotary part rotates at a rotational speed above a predetermined threshold speed, the annular air lock gap (55) being formed by an inner surface of the flange (53), an outer part of the opposing parallel surface of the disc (52) and the outer edge of the ring (51).

16 Claims, 6 Drawing Sheets

(51) Int. Cl.
| | |
|---|---|
| *F16H 57/04* | (2010.01) |
| *F16J 15/42* | (2006.01) |
| *F16N 7/36* | (2006.01) |
| *F16N 21/00* | (2006.01) |
| *F16N 31/02* | (2006.01) |

(52) U.S. Cl.
CPC ..... *F16H 57/0412* (2013.01); *F16H 57/0472* (2013.01); *F16J 15/42* (2013.01); *F16N 7/363* (2013.01); *F16N 21/00* (2013.01); *F05B 2240/57* (2013.01); *F05B 2260/221* (2013.01); *F05B 2260/40* (2013.01); *F05B 2260/98* (2013.01); *F16H 57/0471* (2013.01); *F16N 31/02* (2013.01); *F16N 2210/025* (2013.01); *F16N 2210/14* (2013.01)

(56) References Cited

U.S. PATENT DOCUMENTS

| | | | | |
|---|---|---|---|---|
| 2,886,350 | A * | 5/1959 | Horne | F16J 15/42 |
| | | | | 277/427 |
| 4,212,475 | A | 7/1980 | Sedy | |
| 6,991,378 | B2 | 1/2006 | Jacquemont et al. | |
| 2003/0219345 | A1 * | 11/2003 | Sugita | B23Q 1/70 |
| | | | | 184/6.14 |
| 2011/0138963 | A1 * | 6/2011 | Pischel | F03D 15/00 |
| | | | | 277/358 |
| 2012/0141270 | A1 | 6/2012 | Minadeo et al. | |
| 2013/0056989 | A1 | 3/2013 | Sabhapathy | |
| 2013/0192216 | A1 | 8/2013 | Berlin, Jr. et al. | |
| 2019/0203840 | A1 * | 7/2019 | Katori | F16J 15/342 |

FOREIGN PATENT DOCUMENTS

| | | |
|---|---|---|
| CN | 202251985 U | 5/2012 |
| CN | 207093775 U | 3/2018 |
| DE | 970408 C | 9/1958 |
| EP | 2343455 A1 | 7/2011 |
| FR | 2621970 A1 | 4/1989 |
| GB | 147600 A | 8/1921 |
| GB | 475326 A | 11/1937 |
| GB | 634855 A | 3/1950 |
| GB | 936599 A | 9/1963 |
| WO | 2011070984 A1 | 6/2011 |
| WO | 2014002296 A1 | 1/2014 |

OTHER PUBLICATIONS

China National Intellectual Property Administration, First Notification of Office Action in CN Application No. 201880092000.5, dated Jan. 18, 2022.

Intellectual Property India, Examination Report in IN Application No. 202017042708, dated Jun. 3, 2022.

Danish Patent and Trademark Office, Search and Examination Report in PA 2018 70219, dated Oct. 15, 2018.

European Patent Office, International Search Report and Written Opinion in PCT Application No. PCT/DK2018/050341, dated Jan. 30, 2019.

* cited by examiner

WIND TURBINE DRIVETRAIN COMPONENT WITH LOW FRICTION RADIAL SHAFT SEAL

FIELD OF THE INVENTION

The invention relates to a wind turbine drivetrain component comprising a rotating shaft with a radial seal. The invention further relates to a method for cooling a wind turbine drivetrain component.

BACKGROUND OF THE INVENTION

Wind turbines comprise many rotating parts that are drenched in oil or other lubricants to ensure they run smoothly and are wear-resistant. Additionally, the oil plays a role in dissipating heat produced by the rotating parts and intermeshing gears. An oil circulation circuit provides a continuous flow of oil through the rotating parts and allows for filtering and cooling of the lubricant elsewhere. Where a rotating part is not fully enclosed in the oil filled cavity, but is also in contact with an air filled compartment, seals are provided for ensuring that the oil cannot leak into the air filled compartment and air does not penetrate into the oil. From the perspective of the oil filled compartment, the seal has the task to keep oil in and air out.

Traditionally contact seals have been used to provide the required air-oil barrier. A flexible and resilient material, usually some kind of rubber, rotates with the rotating part and keeps in contact with the stationary part while it slides along its surface. However, over time, the material of the seal may deteriorate resulting in reduced contact between the rotating seal and the stationary part. Air and oil may start leaking through the seal and replacement of the seal is needed to ensure the proper functioning of the device.

In wind turbines, for example, at the interface between the gearbox and the generator, the rotating shaft extends from an oil filled gearbox cavity into an air filled compartment of the nacelle. A seal is provided to prevent the exchange of air and oil between the gearbox and the air compartment. An airflow based external gearbox and/or generator cooling may cause high airflow in the air filled compartment and pressure differences between the two compartments at both sides of the interface, which further increases the need for a high quality airtight and fluid tight seal.

Typical modern wind turbines have towers that can be more than 80 meters high. Repair and maintenance of wear parts can therefore be a difficult and time consuming job. Many seal locations are not easily accessible and seal replacement is a highly disruptive maintenance activity. Replacement of the seal at the gearbox-generator interface is only possible when the wind turbine is out of service. The resulting downtime of the wind turbine reduces its energy yield and profitability.

There is therefore a need to provide a better seal that doesn't need to be replaced as often as a traditional seal.

SUMMARY OF THE INVENTION

According to the invention this object is achieved by providing the radial seal with a stationary part and a rotating part. The stationary part comprises a ring with an inner edge and an outer edge, the inner edge being configured for contactlessly surrounding the shaft. The rotary part comprises a disc, coaxially connected to the shaft for rotation therewith and comprising a flange that wraps around the outer edge of the ring. The radial seal further comprises an annular air lock gap for containing an amount of lubrication fluid and thereby closing off the air lock gap when the rotary part rotates at a rotational speed above a predetermined threshold speed, the annular air lock gap being formed by an inner surface of the flange, an outer part of the opposing parallel surface of the disc and the outer edge of the ring.

An important advantage of this new radial seal is that it does not rely on any direct contact between the rotary and the stationary parts for providing an airtight and fluid tight barrier between an oil filled cavity and an air filled compartment. When a sufficient amount of lubrication fluid, e.g. oil, is present in the seal and the shaft, with the disc, rotates at a rotational speed above the threshold speed, centrifugal forces will force the lubricant outward, where it will be caught by the rotating annular reservoir (i.e., the air lock gap) formed by the disc and the flange at its outer edge. With the outer edge of the stationary ring extending into the lubricant filled air lock gap, the route for fluid leaving or air entering the seal is blocked. The rotary part rotates freely with respect to the stationary part. No direct contact between the two parts is needed. Also where the ring rotates close to the disc, there will always be either air or lubricant fluid in between the two, which leads to less friction than in a traditional contact seal and avoids wear of the seal, even after extended use.

When the rotational speed of the rotary part is lowered beyond the threshold speed, the lubricant may fall down into an overflow volume, provided below a rotational axis of the disc and downstream the annular air lock gap. A drain may be provided downstream the overflow volume for allowing the lubricant to flow to a lubrication fluid reservoir. From the reservoir, the lubrication fluid may be pumped up again to the location of the rotating parts, where it can lubricate those parts and again be part of the liquid seal in the annular air lock gap. During operation, there will usually be a continuous flow of fluid to the rotating parts. Excess fluid is drained out through the overflow volume. In between the overflow volume and the drain, a liquid lock may be provided for preventing an exchange of air between the radial seal and the lubrication fluid reservoir.

It is to be noted that the disc can either be a full disc attached to an outer end of the shaft or a disc with a hole in the middle for receiving the shaft. For the proper functioning of the seal, it is important that no fluid can leak away through an opening between the shaft and the disc. The hole in the disc may have a slightly larger diameter than the shaft it is fitted onto. In that event, a standard seal may be applied between the shaft and the disc for preventing fluid leaking therebetween.

In an embodiment of the invention, the radial seal further comprises a fluid flow channel, provided in between opposing parallel surfaces of the ring and the disc. An entrance of the fluid flow channel is located at the inner edge of the ring. An exit of the fluid flow channel is located at the outer edge of the ring. The annular air lock gap is located at the exit of the fluid flow channel. The fluid flow channel may be the only available flow path between an oil cavity at one side of the seal and an air compartment at the other side.

When the shaft rotates at low speed or does not rotate at all, lubricant flowing over the rotating shaft will fall down into a bottom part of the annular air lock gap and/or into an overflow volume provided below the rotational axis. Like before, the overflow volume is provided downstream the annular air lock gap and thus also downstream the fluid flow channel.

When the shaft speeds up, centrifugal forces push the fluid radially outward through the flow cannel and in all radial directions, over the inner surface of the disc. When the rotational speed exceeds the threshold value, more fluid is pushed outward and all the way to the outer edge of the disc, where it will be caught up in the annular air lock gap formed at the flange. When the whole air lock gap is filled with lubricant, the fluid flow channel exit is effectively blocked off for any air that wants to get into the fluid flow channel. Any excess lubricant that enters the seal will fall into the overflow volume, either directly at the entrance of the fluid flow channel or later after being pushed out at the downstream end of the annular air lock gap by new fluid that fills up the air lock gap.

Additionally or alternatively, the radial seal may comprise a supply tube for supplying the lubrication fluid to a release point adjacent the annular air lock gap. Instead of relying on the centrifugal forces to deliver the lubricant to the annular air lock gap, the supply tube can release the lubricant directly at the air lock gap. Also when such a supply tube is used, the shaft speed will still have to above a threshold speed for allowing the centrifugal forces to keep the full annular air lock gap filled with lubricant.

An additional labyrinth seal may be provided downstream the annular air lock gap and between the stationary part and the rotary part. When the shaft is rotating at a higher speed, fluid may still come off the downstream end of the annular air lock gap. The labyrinth seal helps to keep that fluid at the wet side of the seal and avoids that it enters the dry cavity at the other side of the seal. A labyrinth seal is used, because it also is a contactless type of seal and thus can be added without losing any of the advantages of the current invention.

Optionally, the ring comprises vanes and/or wings at it surface, adjacent the outer edge of the ring. Such vanes or wings may assist the centrifugal forces in moving the lubricant outward into the annular air gap lock and keeping it there while the shaft is rotating fast enough. With the addition of the vanes and/or wings, the seal may provide better sealing at lower rotational speeds.

The seal according to the invention may be used with rotating shafts in wind turbines, e.g. at the output shaft of the wind turbine gearbox and/or at the input shaft of a wind turbine generator. According to a further aspect of the invention, a method is provided for cooling a wind turbine drivetrain component with a seal as described above, using a cooling fan. Typically, the generator, which is situated immediately adjacent the gearbox, is cooled by an airflow. The invention, however also applies to situations in which other drivetrain elements are air-cooled. It is to be noted that the main purpose of the cooling system may be to cool a wind turbine drivetrain component that does not itself comprise the above described radial seal, but is only placed close to such a seal. However, also in such a configuration, the drivetrain component with the radial seal will be cooled by the nearby airflow.

The method according to the invention comprises the steps of checking if the annular air lock gap is closed and, only if the annular air lock gap contains the amount of lubrication fluid, turning on a cooling fan. This will ensure that the increased air flow and pressure differences induced by the cooling fan will not occur before the annular air lock gap is filled with lubricant and the liquid seal is fully established. The step of checking may, e.g., comprise determining a current rotational speed of the rotational part or determining if the amount of lubrication fluid is contained in the air lock gap. E.g., speed sensors or fluid sensor may be used for this purpose.

It will be appreciated that preferred and/or optional features of the first aspect of the invention may be combined with the other aspects of the invention. The invention in its various aspects is defined in the independent claims below and advantageous features are defined in the dependent claims below.

BRIEF DESCRIPTION OF THE DRAWINGS

For a better understanding of the invention, some embodiments of the invention will now be described with reference to the following drawings, in which.

DETAILED DESCRIPTION

Figure 1:
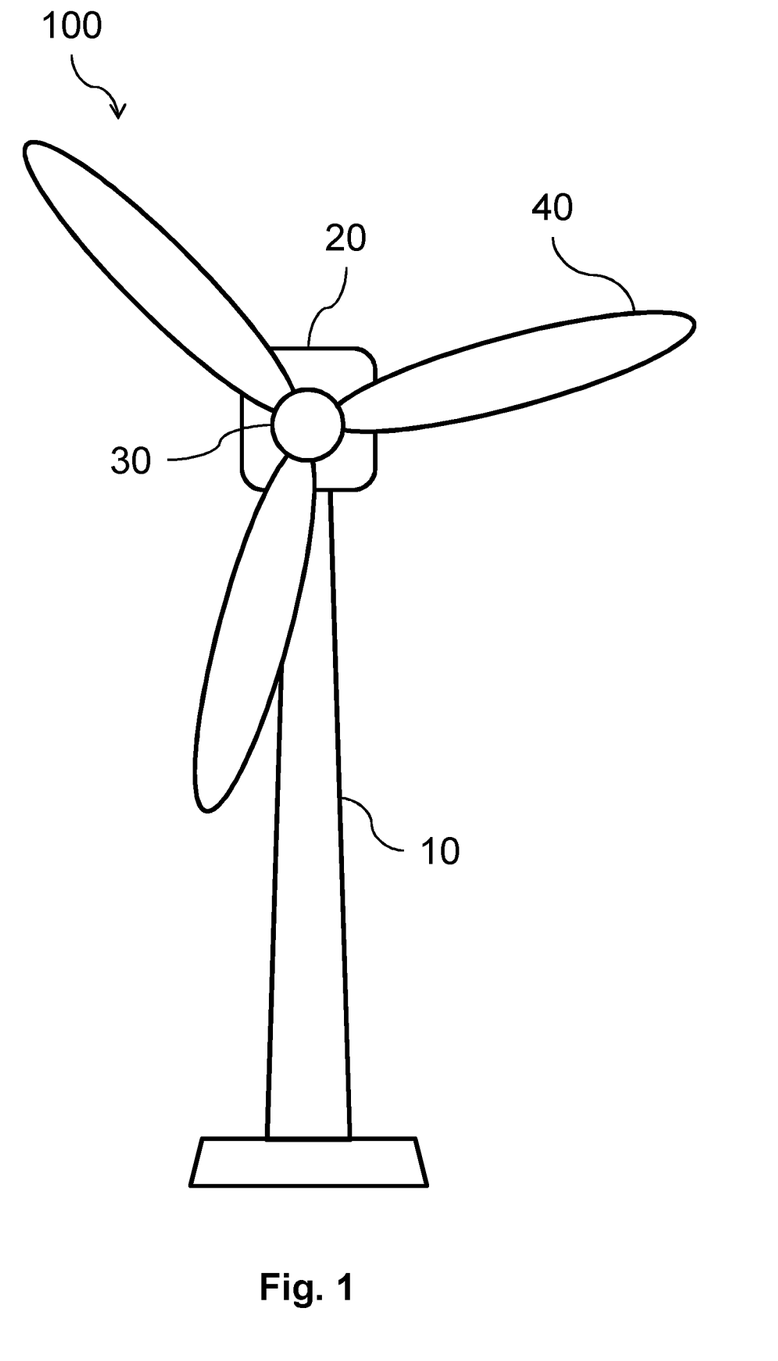
FIG. 1 schematically shows a wind turbine in which the current invention could be advantageously used.

FIG. 1 schematically shows a wind turbine 100 in which the current invention could be advantageously used. The wind turbine 100 comprises a tower 10 with on top thereof a nacelle 20, comprising many of the functional parts of the wind turbine 100. A rotor hub 30 is rotatably mounted to the front end of the nacelle 20 and carries a number of rotor blades 40. The wind turbine 100 shown here comprises three rotor blades 40, but wind turbines with more or less rotor blades 40 are also possible. The wind turbine 100 produces electrical energy by turning (yawing) the nacelle 20 such that the plane in which the rotor blades 40 rotate is positioned more or less perpendicular to the direction of the wind. In the nacelle 20, a generator is used for converting the hub rotation into electricity.

Figure 2:
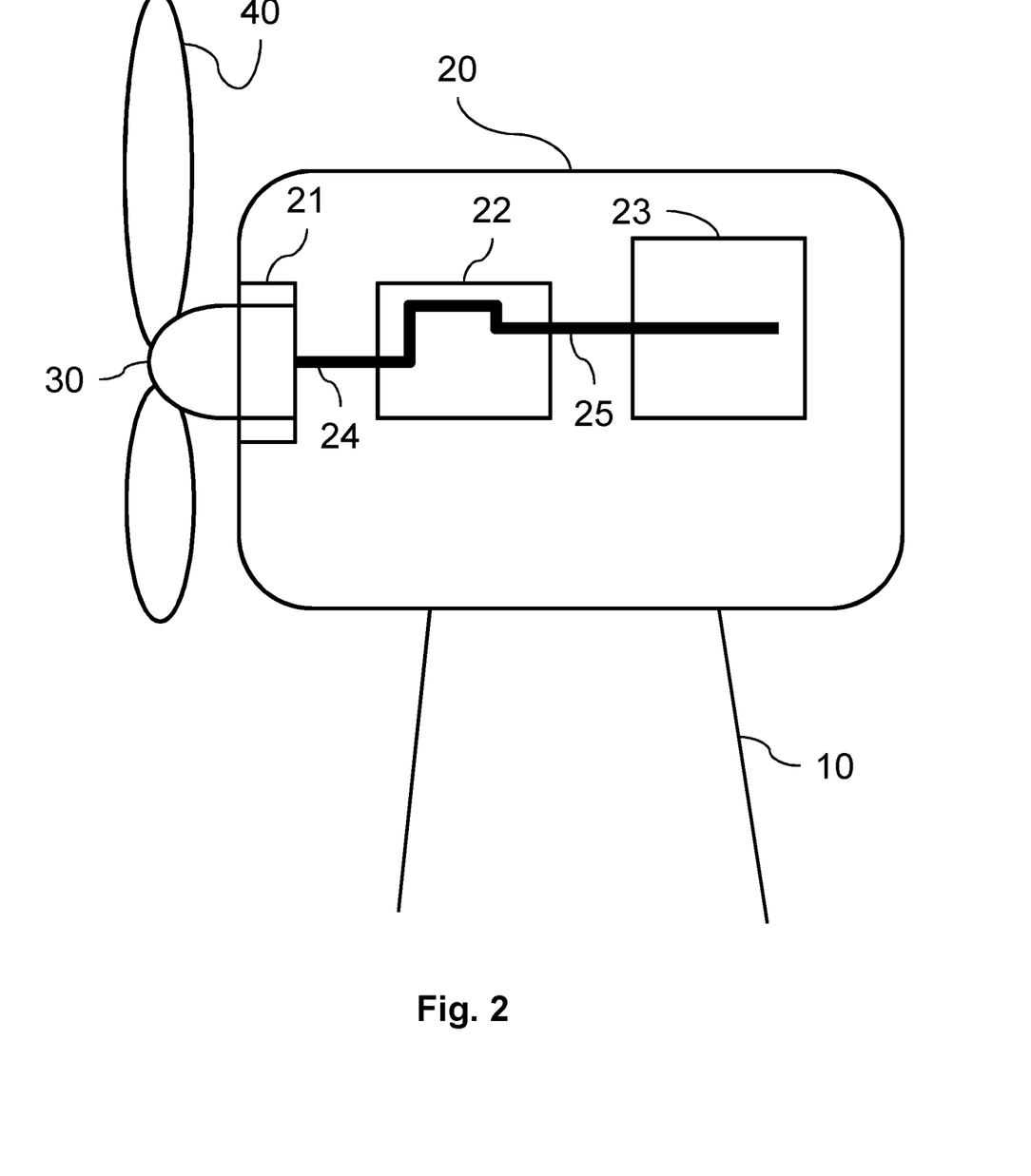
FIG. 2 schematically shows a cross section of the nacelle of the wind turbine shown in FIG. 1.

FIG. 2 schematically shows a cross section of the nacelle 20 of the wind turbine 100 shown in FIG. 1. In operation, wind causes the rotor blades 40 and the rotor hub 30 to rotate. A powertrain, being enclosed by the nacelle 20 converts the rotation of the rotor hub 30 into electrical power. Power cables (not shown) run from the powertrain, down through the tower 10, to the ground, where the electrical power may be used, stored in a battery or transferred to an electrical grid. The powertrain of this wind turbine 100 comprises a main bearing 21, provided for supporting the rotor hub 30 and facilitating its rotation. An output shaft 24, rotating together with the rotor hub 30, forms the input of a subsequent gearbox 22. In the gearbox 22, the rotational speed of the low-speed rotor hub 30 at the gearbox input is converted into a higher rotational speed for the electrical generator 23 at the gearbox output. The electrical generator 23 turns the rotary power of the gearbox output shaft 25 into useful electrical power that is then transported down through the wind turbine tower 10.

Lubrication of critical powertrain components is important for ensuring their function. Usually, the lubricant is an oil, but other lubrication fluids may also be used. The oil is usually comprised in a cooling circuit with an oil tank and a pump. The pump pumps the oil from the oil tank to a position where it can lubricate the rotating parts. Used oil is then collected and led back to the oil tank. Preferably, in order to keep the oil clean and minimize wear, the oil is filtered before it is pumped back to the rotating parts. Optionally, the oil can also be cooled and/or heated for thermal management of the rotating wind turbine parts.

The rotating components may either be comprised in an enclosed oil filled cavity or the oil may be pumped from the reservoir (i.e. the oil tank) to a location near the rotating part for delivering the lubricant directly there where it is needed. The former arrangement is generally called a wet sump lubrication system and the latter a dry sump. Although the radial seal according to the invention will be described in relation to, and may be most beneficial in, a wet sump lubrication circuit, it can also be used in a dry sump arrangement without needing any special modification.

Figure 3:
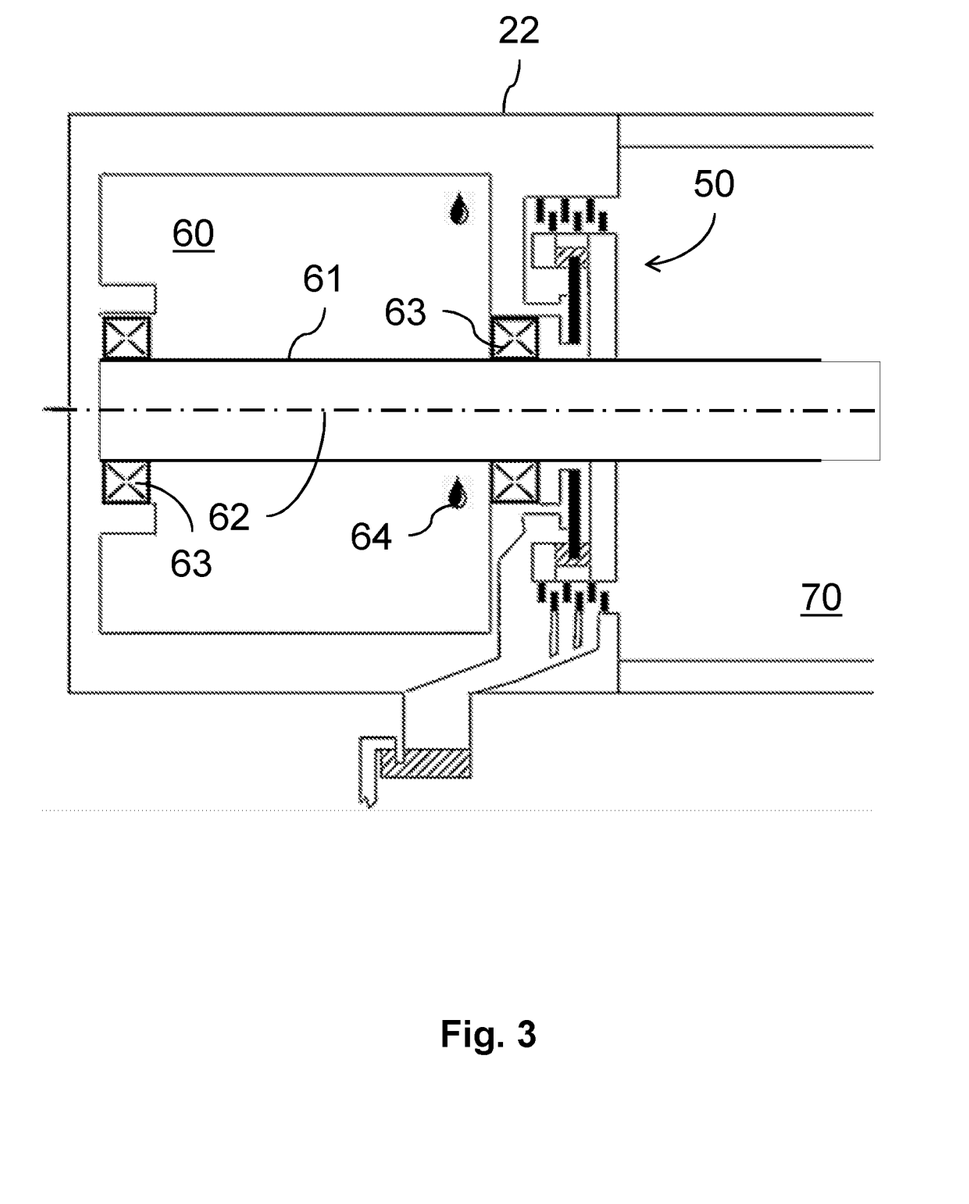
FIG. 3 schematically shows a cross section of the radial seal according to the invention.

FIG. 3 schematically shows a cross section of the radial seal 50 according to the invention. In this embodiment, the radial seal 50 is provided on a rotating shaft 61 that extends through an oil filled cavity 60 of, e.g., a gear box 22 and into an air filled compartment 70 outside the gearbox 22. For example in a wind turbine 100, the output shaft 61 of the gearbox 22 may be the input shaft 61 of the generator 23. The shaft 61 is mounted into a set of bearings 63 for rotation Because the shaft 61 extends through the gearbox wall, a seal 50 is needed for preventing the oil 64 from leaking into the air compartment. Especially when the gearbox 22 and/or the generator 23 are air-cooled, such oil leakage could be rather problematic. The high amount of circulating air inside the generator creates a differential pressure between the air compartment 70 and the gearbox cavity 60. In combination with the leaking oil, this may lead to the formation of an oil mist in the air compartment 70. Such oil mist may lead to various technical problems in the nacelle 20, e.g. by impeding the proper functioning of brake pads. In FIG. 3, the main functional elements of the radial seal 50 according to the inventions are shown. The working of the radial seal 50 will be explained in detail below, with reference to FIG. 4.

Figure 4:
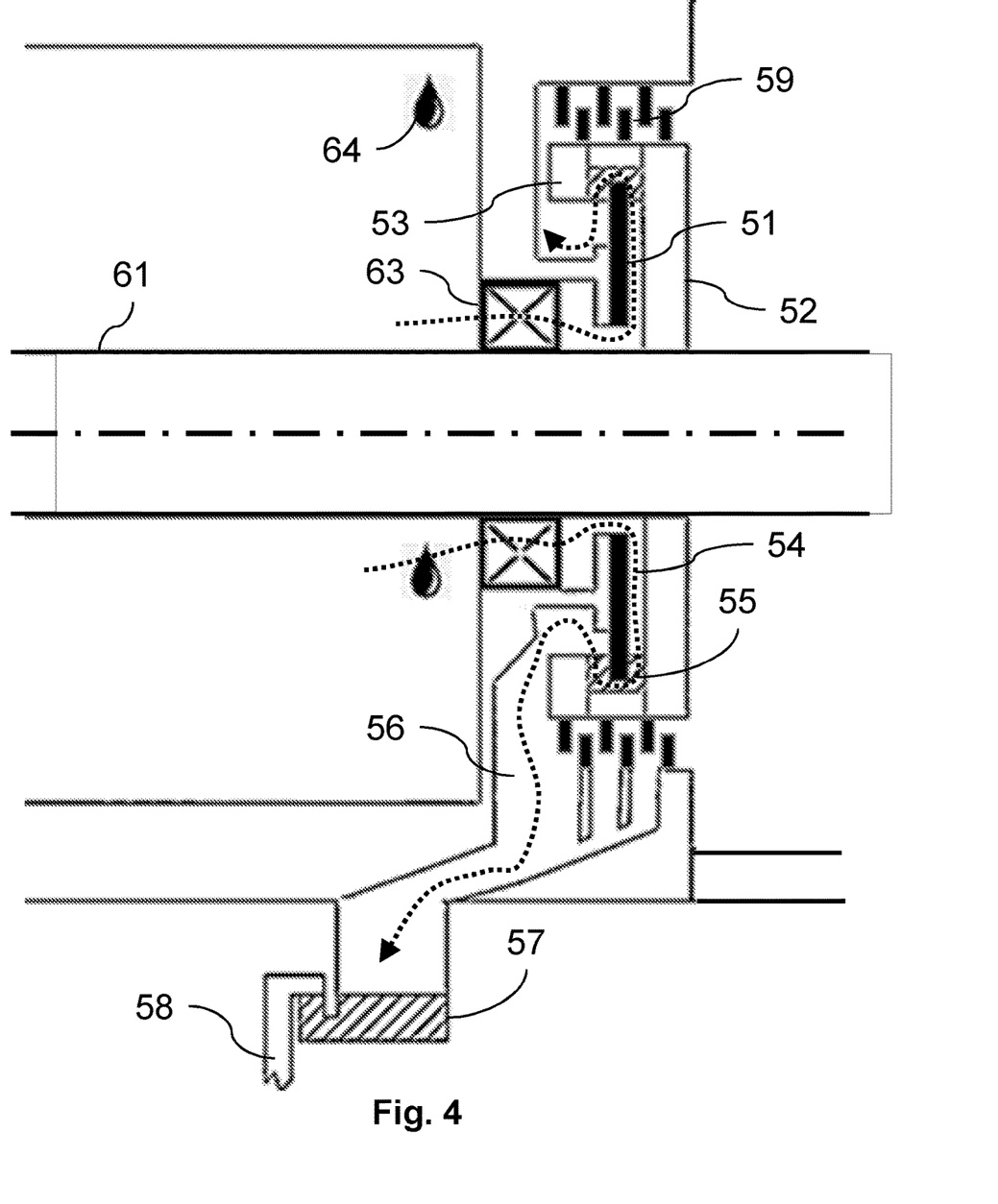
FIG. 4 shows a close-up of the cross section of FIG. 3.

FIG. 4 shows a close-up of the cross section of FIG. 3. In this cross-section, a ring 51 is shown that is fixedly connected to the housing of the gearbox 22. A central hole in the ring 51 is large enough to receive the shaft 61 and to leave a gap between the shaft 61 and the ring 51 through which the oil 64 can flow. The ring 51 can be made of either a harder or a softer material. Softer materials, such as rubber, may come with the advantage that they are easier to assemble to the gearbox housing. A disc 52 is coaxially connected to the shaft 61 and closes off the flow path for oil 64 running over the shaft surface. The disc 52 rotates together with the shaft 61. A small gap between opposing surfaces of the stationary ring 51 and the rotating disc 52 forms a flow channel 54 through which accelerated oil 64 can flow towards an air lock gap 55 at the outer edge of the ring 51. This gap may be adjustable, e.g. by sliding the disc 52 along the shaft 61, to allow for adjustment and optimization of the fluid flow dynamics in the radial seal 50.

A flange 53 at the outer edge of the disc 52 wraps around the outer edge of the ring 51 to form a U-shaped gap 55 between the inner surfaces of the flange 53 and the disc 52 and the outer edge of the ring 51. In this example, the flange 53 is positioned at the outer edge of the disc 52, but if the disc 52 had a larger diameter, the flange 53 would have been radially inside of that outer edge. As will be explained in more detail below, the U-shaped gap when filled with liquid will seal of the flow path 54 for liquid from the inside and air from the outside of the gearbox 22. In a gap between the outer surface of the rotating flange 53 and the stationary gearbox housing 22, a labyrinth seal 59 may be provided as an additional seal. Also other types of seals may be used as a secondary seal, but labyrinth seals have the advantage that they are contactless and will not wear off as quickly as contact seals.

Arrows meandering through the bearing 63, the flow path 54, the air lock gap 55 and the overflow volume 56 indicate routes the oil 64 may follow when lubricating the bearing 63 of a rotating shaft 61. When the shaft 61 is not rotating and the oil 64 is not pumped through the lubrication circuit, some oil 64 may still leak through the bearings and will then fall down into the overflow volume 56. At the lower part of the annular flange 53, some remaining oil 64 may fill the U-shaped air lock gap 55, but the greater part of the air lock gap 55 will not be sealed. This is not considered a problem, because when the shaft 61 is not rotating there is little or no risk of oil leaking into the air compartment, even less when the additional labyrinth seal 59 is installed to close off the gap between the disc 52 and the gearbox housing.

When the shaft 61 starts rotating and oil 64 is pumped through the lubrication circuit, more oil will flow through the bearing 63 and through the gap between the ring 51 and the shaft 61. At lower rotation speeds, the oil 64 will then fall down into the overflow volume 56. At higher rotation speeds, the rotation of the shaft 61 causes a centrifugal force that pushes the oil 64 radially outward through the flow path 54. When the rotational speed exceeds a predetermined threshold, a sufficient amount of oil 64 is pushed radially outward into the air lock gap 55 to effectively close off the opening between the stationary ring 51 and the rotating disc 52. A fluid tight and airtight seal is established without needing any direct contact between the stationary part and the rotary part. Vanes and/or ridges on the ring surface and/or the opposing disc surface may assist in the forming of the fluid seal in the air lock gap 55.

While the shaft 61 is rotating and the lubricant pump pumping, fresh oil continues to flow through the bearings 63. With the flow path 54 and the air lock gap 55 already filled, the additional oil 64 may either fall into the overflow volume 56 or push some out oil out of the air lock gap 55, which pushed out oil will then fall down into the overflow volume 56. Because of the continuous inflow of new oil 64, the air lock gap 55 will continue to be filled with liquid. Only when the rotational speed of the shaft 61 falls below the threshold speed, the seal is broken, but at such low rotational speeds, the risk of leakages is low.

Figure 5:
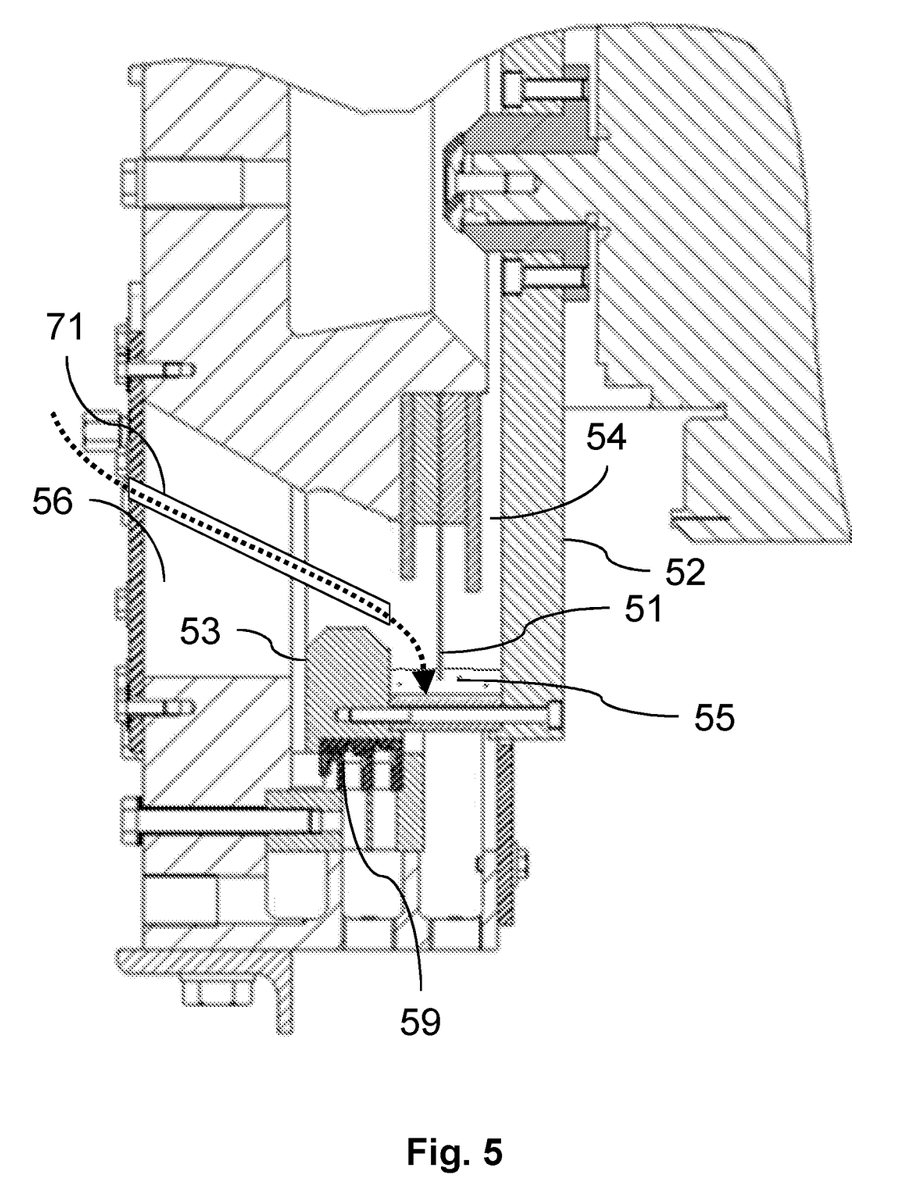
FIG. 5 schematically shows a cross section of a second embodiment of the radial seal according to the invention.

FIG. 5 schematically shows a cross section of a second embodiment of the radial seal according to the invention. The main difference with the embodiment of FIGS. 3 and 4 is that a supply tube 71 is provided for delivering some lubricant directly from the oil cavity 60 to the air lock gap 55. The centrifugal force of the rotating shaft 61 is still needed to keep the fluid in the air lock gap 55, but the filling of the gap 55 may be a little bit more reliable than when relying on the centrifugal forces pushing the fluid through the flow path 54.

Figure 6:
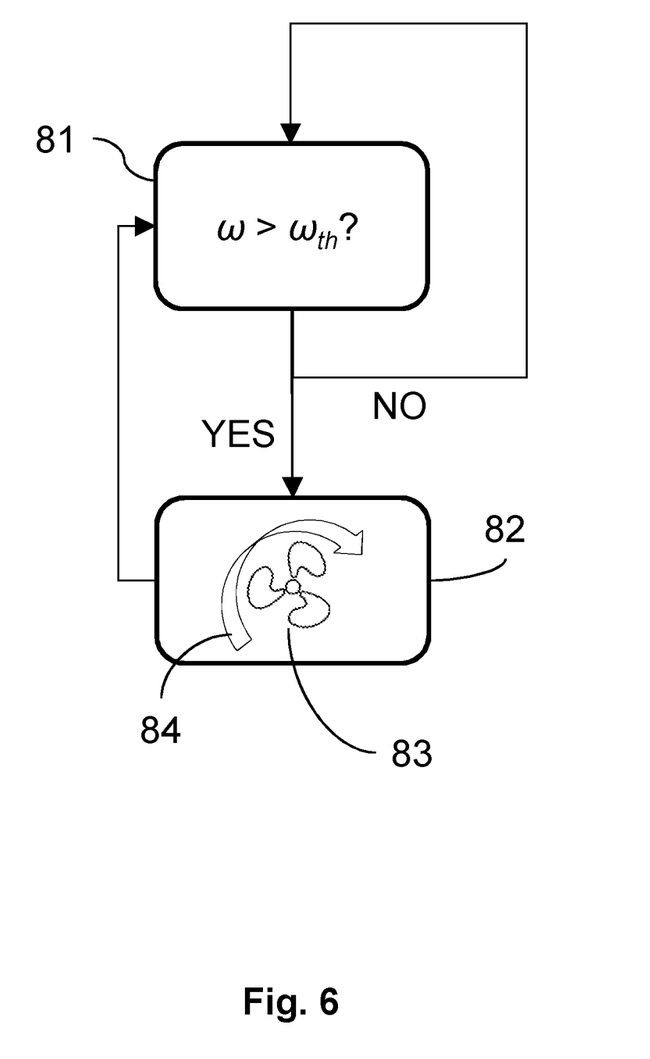
FIG. 6 shows a flow chart of a method according to the invention.

FIG. 6 shows a flow chart of a method for cooling a wind turbine drivetrain component as described above. The gearbox 22 comprises a shaft 61 extending through the gearbox housing into an air compartment 70. Either the gearbox 22 itself or an operational drivetrain component nearby the gearbox is cooled by an air fan 83 or a different type of airflow based cooling device. The airflow 84 from the fan 83 causes pressure differences between the air compartment 70 and the inside of the gearbox 22. This pressure difference may cause lubricant from the gearbox 22 to leak into the air compartment 70 if no proper seal would have been provided.

With a seal 50 as described above, the following control method is used for preventing the lubricant from leaking into the air compartment 70.

The method starts with a step 81 of checking whether the annular air lock gap 55 is closed and a proper seal has been established. For example, a sensor may check if the annular air lock gap 55 is filled with a sufficient amount of fluid to effectively establish the seal 50. Checking the presence of fluid in the air lock gap 55 may, e.g., be done using a contact sensor or a light based sensor. A reliable indirect measurement of the establishment of a proper seal is provided by measuring the rotational speed ($\omega$) of the gearbox 22 exceeds the threshold speed ($\omega_{th}$) of the seal 50. The rotational speed ($\omega$) may, e.g., be measured using speed sensors on the shaft 61. When the rotational speed ($\omega$) exceeds the threshold speed ($\omega_{th}$), it can be assumed that the annular air lock gap 55 is closed off by the lubricant. To ensure that enough lubricant is present for filling the gap, this step 81 may further comprise a check of the current status of the lubricant pump. When the lubricant pump is active, there will be a continuous flow of lubricant through the system and the seal can be established. Of course, different types of sensors can be combined for an even more reliable seal establishment check 81.

If it turns out that the annular gap has not yet been filled with fluid, the seal establishment check 81 will be repeated on set time intervals, until the air lock gap 55 is filled with lubricant and the check 81 provides a positive result. Speeding up the shaft 61 and turning on the lubricant pump may of course speed up the establishing of the seal.

When it is determined that the air lock gap 55 is closed, the cooling fan 83 is activated in step 82. Preferably, while the cooling fan 83 is active, the system keeps checking the quality of the seal. When rotational speed of the shaft 61 drops below the threshold speed ($\omega_{th}$) or when the fluid sensor indicates that the air lock gap 55 is not filled with a sufficient amount of lubricant, the fan 83 is turned off.

It will be appreciated that preferred and/or optional features of the first aspect of the invention may be combined with the other aspects of the invention. The invention in its various aspects is defined in the independent claims below and advantageous features are defined in the dependent claims below.

The invention claimed is:

1. A wind turbine drivetrain component comprising a rotating shaft with a radial seal, the radial seal comprising a stationary part and a rotating part,
   the stationary part comprising a ring with an inner edge and an outer edge, the inner edge being configured for contactlessly surrounding the shaft,
   the rotary part comprising a disc, coaxially connected to the shaft for rotation therewith and comprising a flange that wraps around the outer edge of the ring,
   a bearing disposed between the stationary part and the rotary part and being exposed to a lubrication fluid to lubricate the bearing;
   the radial seal further comprising an annular air lock gap for containing an amount of the lubrication fluid and thereby closing off the air lock gap when the rotary part rotates at a rotational speed above a predetermined threshold speed, the annular air lock gap being formed by an inner surface of the flange, an outer part of the opposing parallel surface of the disc and the outer edge of the ring.

2. The wind turbine drivetrain component as claimed in claim 1, wherein the radial seal further comprises a fluid flow channel, provided in between opposing parallel surfaces of the ring and the disc, an entrance of the fluid flow channel being located at the inner edge of the ring, an exit of the fluid flow channel being located at the outer edge of the ring, the annular air lock gap being located at the exit of the fluid flow channel.

3. The wind turbine drivetrain component as claimed in claim 1, wherein the radial seal further comprises a supply tube for supplying the lubrication fluid to a release point adjacent the annular air lock gap.

4. The wind turbine drivetrain component as claimed in claim 1, wherein the radial seal further comprises an overflow volume, provided below a rotational axis of the disc and downstream the annular air lock gap.

5. The wind turbine drivetrain component as claimed in claim 4, wherein the radial seal further comprises a drain, provided downstream the overflow volume and configured for being coupled to a lubrication fluid reservoir.

6. The wind turbine drivetrain component as claimed in claim 5, wherein the radial seal further comprises a liquid lock provided in between the overflow volume and the drain for preventing an exchange of air between the radial seal and the lubrication fluid reservoir.

7. The wind turbine drivetrain component as claimed in claim 1, wherein the radial seal further comprises a labyrinth seal, provided downstream the annular air lock gap and between the stationary part and the rotary part.

8. The wind turbine drivetrain component as claimed in claim 1, wherein the ring comprises vanes and/or wings at its surface, adjacent the outer edge of the ring.

9. The wind turbine drivetrain component as claimed in claim 1, wherein the drivetrain component is a gearbox or a generator.

10. A method for cooling a wind turbine drivetrain component, the wind turbine drivetrain component comprising:
    a rotating shaft with a radial seal, the radial seal including a stationary part and a rotating part,
    the stationary part including a ring with an inner edge and an outer edge, the inner edge being configured for contactlessly surrounding the shaft,
    the rotary part comprising a disc, coaxially connected to the shaft for rotation therewith and comprising a flange that wraps around the outer edge of the ring, and
    the radial seal further comprising an annular air lock gap for containing an amount of lubrication fluid and thereby closing off the air lock gap when the rotary part rotates at a rotational speed above a predetermined threshold speed, the annular air lock gap being formed by an inner surface of the flange, an outer part of the opposing parallel surface of the disc and the outer edge of the ring,
    the method comprising the steps of:
      checking if the annular air lock gap is closed,
      only if the annular air lock gap contains the amount of lubrication fluid, turning on a cooling fan for cooling the wind turbine drivetrain component.

11. The method for cooling a wind turbine drivetrain component as claimed in claim 10, wherein the step of checking comprises determining a current rotational speed of the rotational part.

12. The method for cooling a wind turbine drivetrain component as claimed in claim 11, wherein the step of checking comprises determining if the amount of lubrication fluid is contained in the air lock gap.

13. The wind turbine drivetrain component as claimed in claim 1, wherein the annular air lock gap is downstream of the bearing.

14. The wind turbine drivetrain component as claimed in claim 1, wherein the annular air lock gap is devoid of a rotary part being positioned therein.

15. A wind turbine drivetrain component comprising a rotating shaft with a radial seal, the radial seal comprising a stationary part and a rotating part,
the stationary part comprising a ring with an inner edge and an outer edge, the inner edge being configured for contactlessly surrounding the shaft,
the rotary part comprising a disc, coaxially connected to the shaft for rotation therewith and comprising a flange that wraps around the outer edge of the ring, and
the radial seal further comprising an annular air lock gap for containing an amount of lubrication fluid and thereby closing off the air lock gap when the rotary part rotates at a rotational speed above a predetermined threshold speed, the annular air lock gap being formed by an inner surface of the flange, an outer part of the opposing parallel surface of the disc and the outer edge of the ring,
wherein the radial seal further comprises an overflow volume, provided below a rotational axis of the disc and downstream the annular air lock gap.

16. A wind turbine drivetrain component comprising a rotating shaft with a radial seal, the radial seal comprising a stationary part and a rotating part,
the stationary part comprising a ring with an inner edge and an outer edge, the inner edge being configured for contactlessly surrounding the shaft,
the rotary part comprising a disc, coaxially connected to the shaft for rotation therewith and comprising a flange that wraps around the outer edge of the ring, and
the radial seal further comprising an annular air lock gap for containing an amount of lubrication fluid and thereby closing off the air lock gap when the rotary part rotates at a rotational speed above a predetermined threshold speed, the annular air lock gap being formed by an inner surface of the flange, an outer part of the opposing parallel surface of the disc and the outer edge of the ring,
wherein the radial seal further comprises a labyrinth seal, provided downstream the annular air lock gap and between the stationary part and the rotary part.

* * * * *